US005745113A

United States Patent [19]
Jordan et al.

[11] Patent Number: 5,745,113
[45] Date of Patent: Apr. 28, 1998

[54] REPRESENTING WORK PRACTICES

[75] Inventors: Brigitte Jordan, La Honda; Ron Goldman, Palo Alto, both of Calif.; Patricia Sachs, Mount Vernon, N.Y.

[73] Assignees: Institute for Research on Learning, Menlo Park, Calif.; Bell Atlantic Science & Technology, Inc., White Plains, N.Y.

[21] Appl. No.: 627,303

[22] Filed: Apr. 3, 1996

[51] Int. Cl.[6] ................................................ G06F 3/00
[52] U.S. Cl. ................................ 345/349; 345/440
[58] Field of Search ............................. 395/331, 339, 395/351, 349, 965, 964, 963, 997, 140, 209, 208, 211

[56] References Cited

U.S. PATENT DOCUMENTS

| | | | |
|---|---|---|---|
| 5,321,610 | 6/1994 | Breslin | 395/209 |
| 5,414,809 | 5/1995 | Hogan et al. | 395/349 |
| 5,420,978 | 5/1995 | Tozawa et al. | 395/334 |
| 5,596,691 | 1/1997 | Good et al. | 395/140 |
| 5,606,695 | 2/1997 | Dworzecki | 395/208 |

*Primary Examiner*—Raymond J. Bayerl
*Assistant Examiner*—Cao H. Nguyen
*Attorney, Agent, or Firm*—Fish & Richardson P.C.

[57] ABSTRACT

A system for recording and displaying information about work practice through a set of at least two different graphical tools, each associated with at least one kind of information about work practice and at least one kind of workplace object. The graphical user interface of each tool has at least one characteristic display metaphor conventional for a kind of information associated with the tool. Each tool has at least one characteristic display metaphor that differs from at least one of the characteristic display metaphors of every other tool in the set of tools. The graphical user interface of one of the tools is augmented to display information of a kind associated with a different one of the tools.

31 Claims, 8 Drawing Sheets

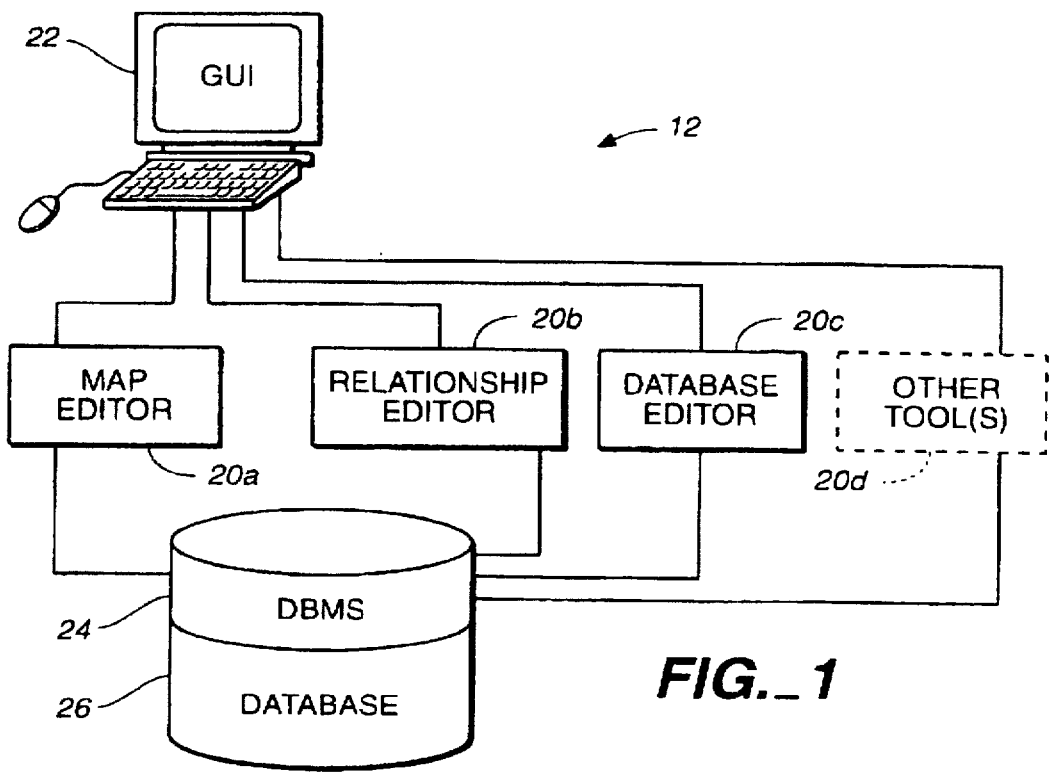
FIG._1
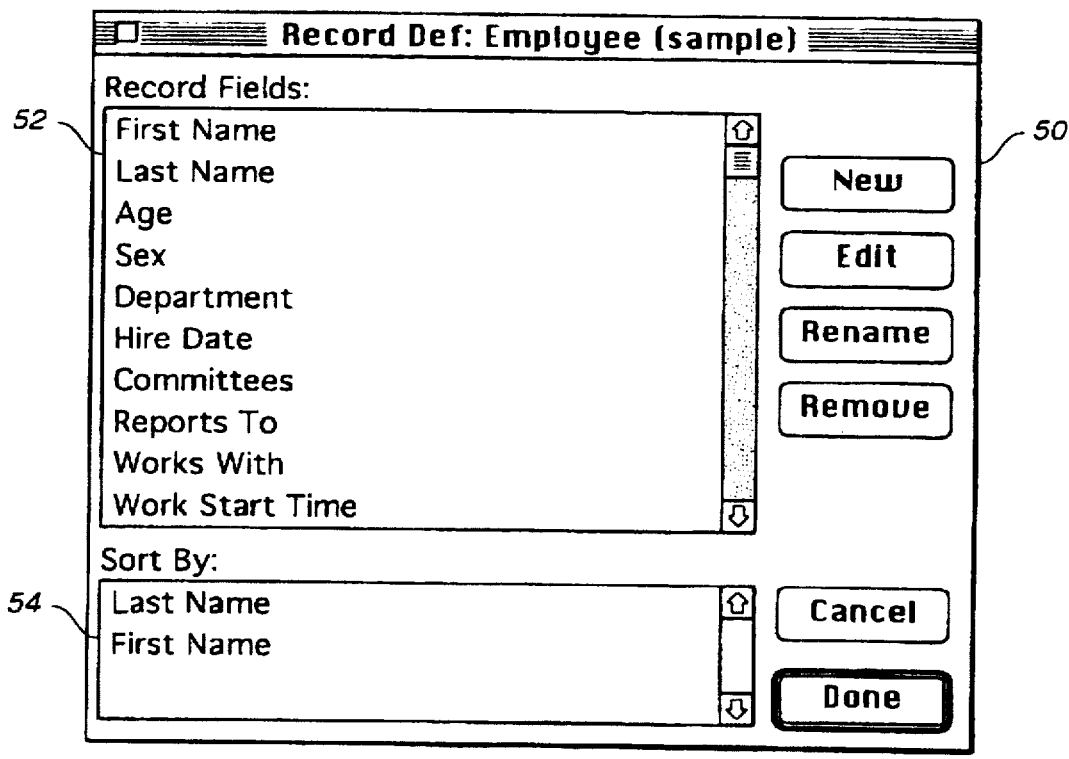
FIG._4

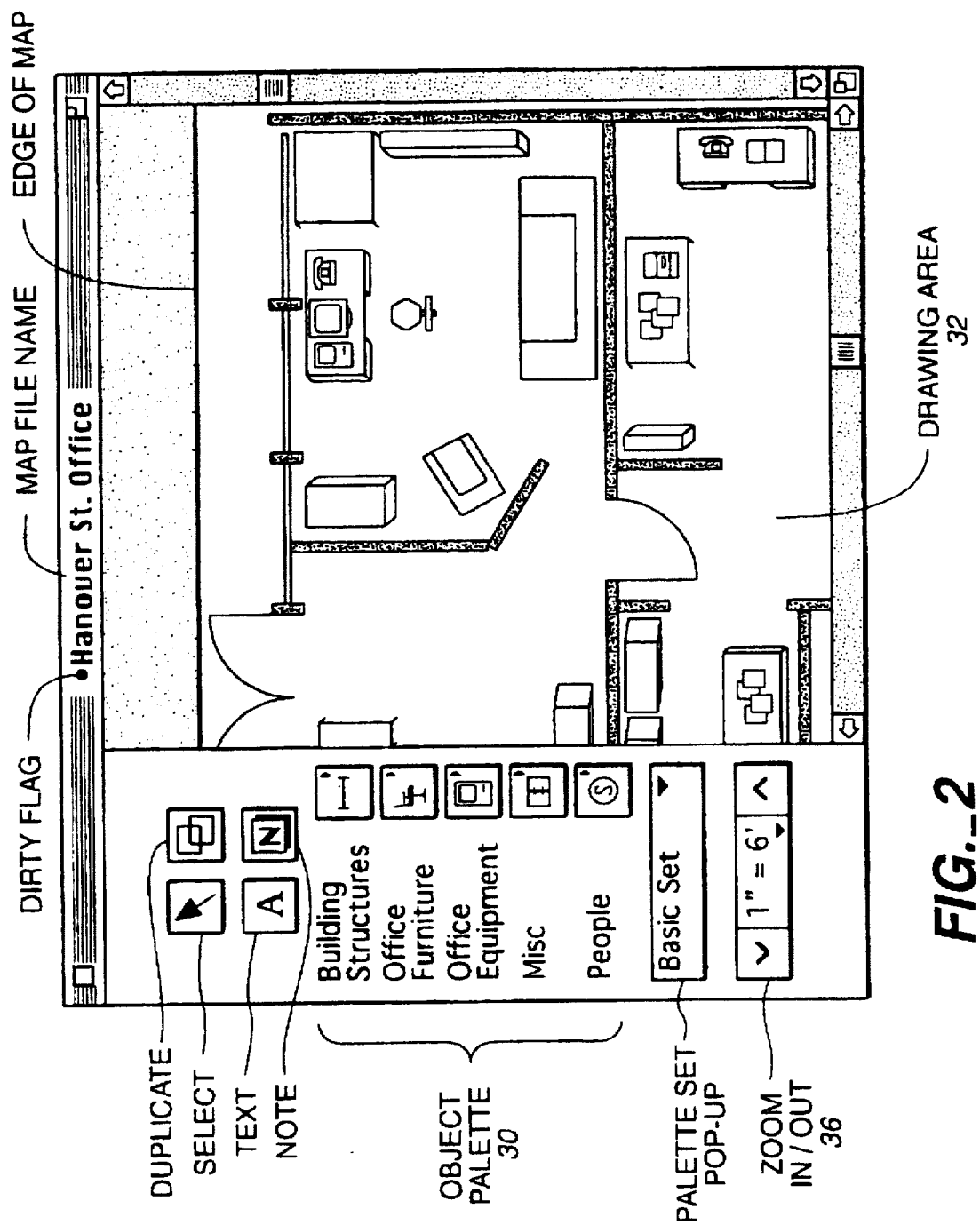
FIG._2

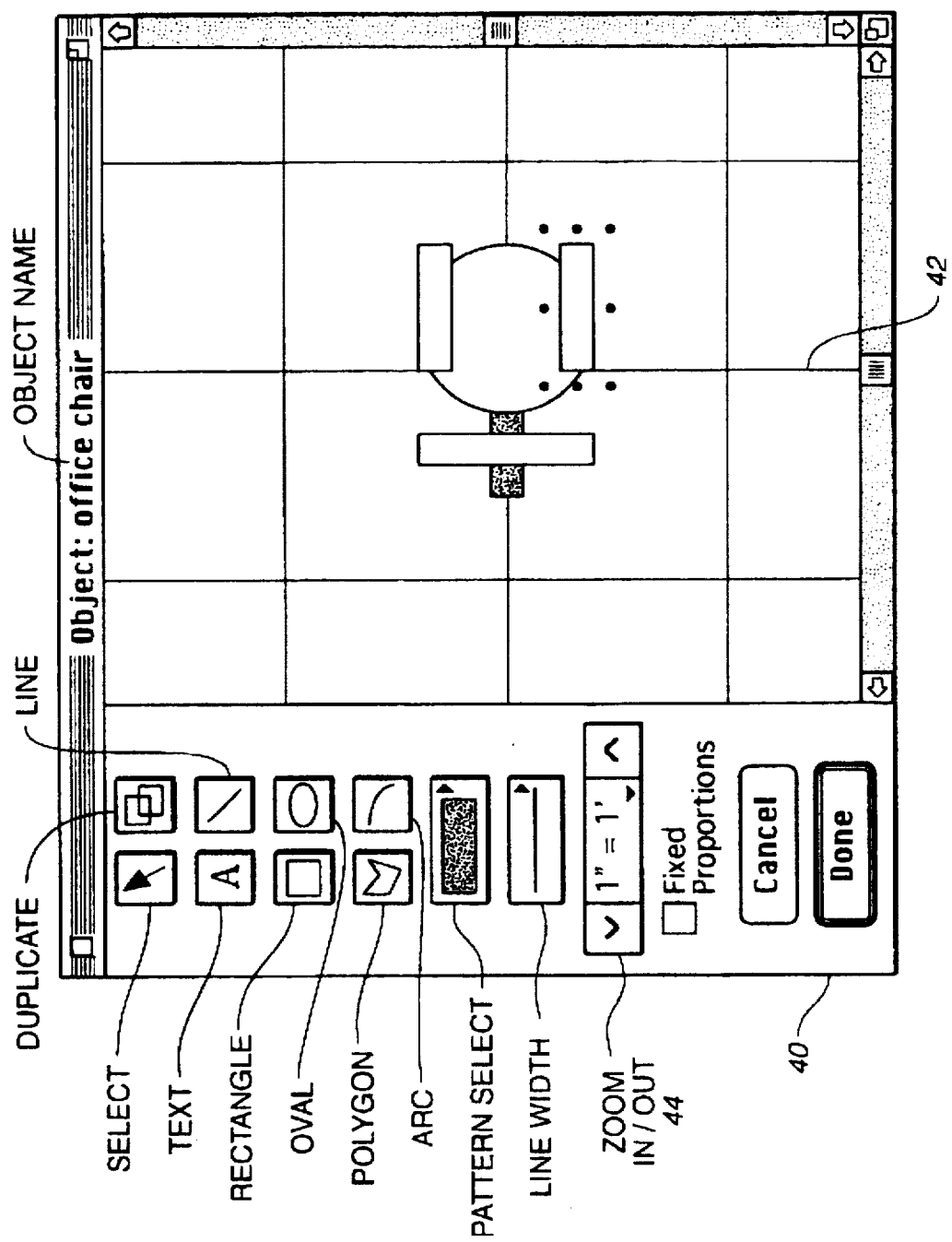
FIG._3

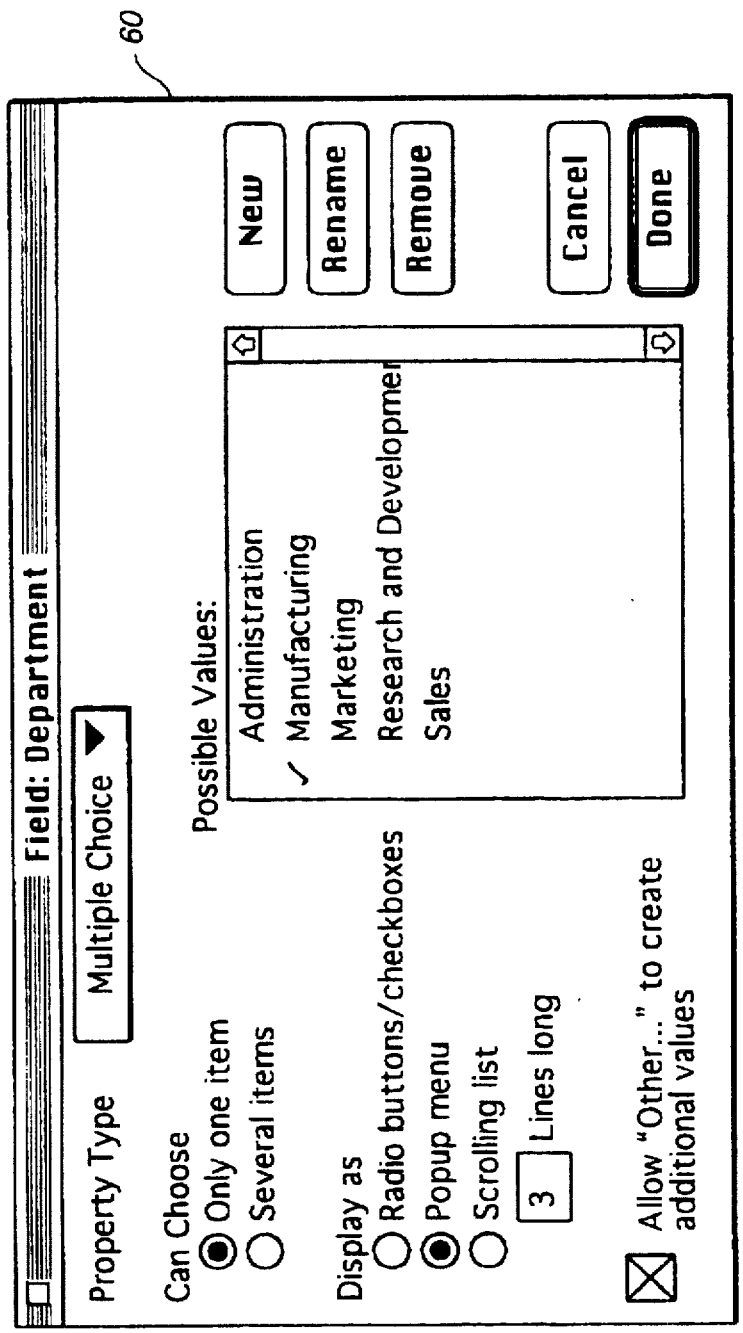
FIG._5

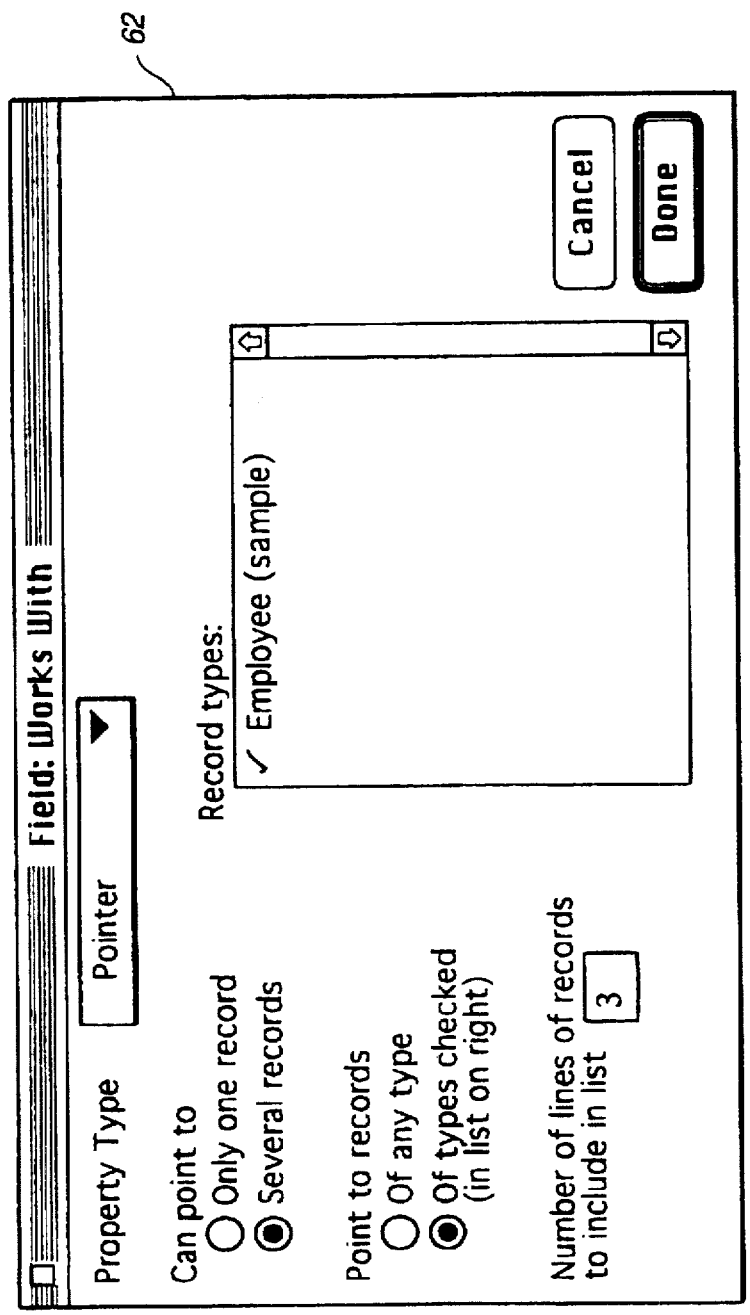
FIG._6

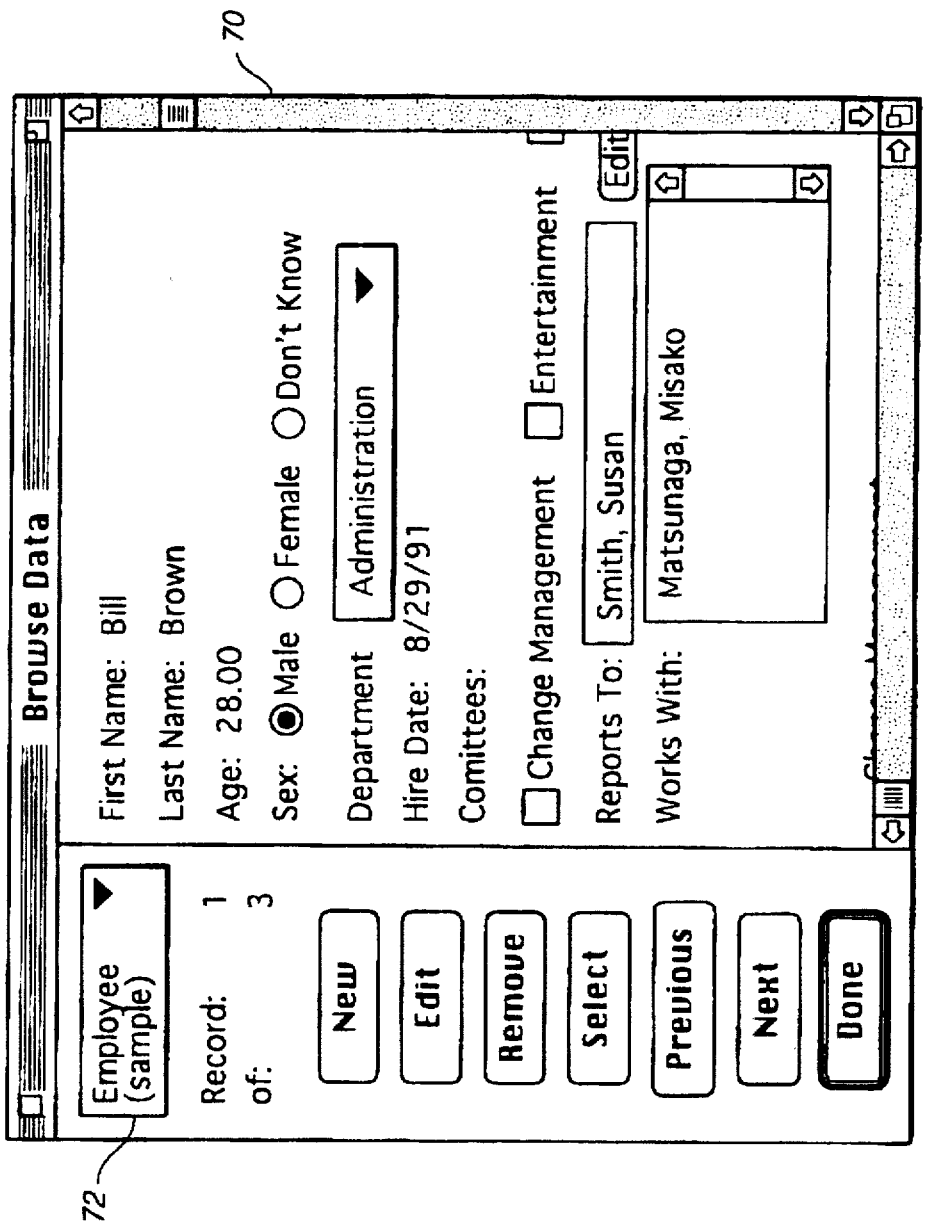
FIG._7

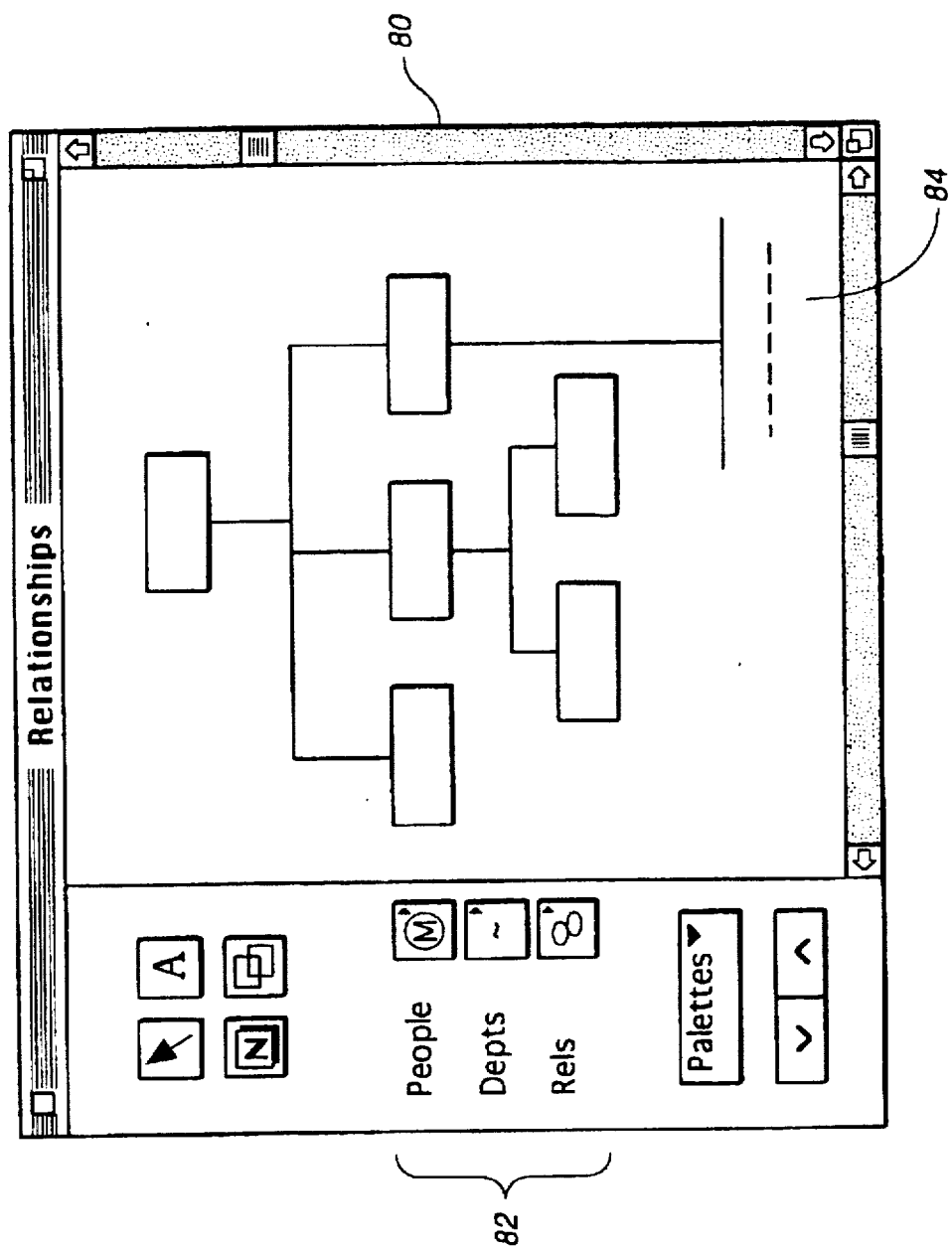
FIG._8

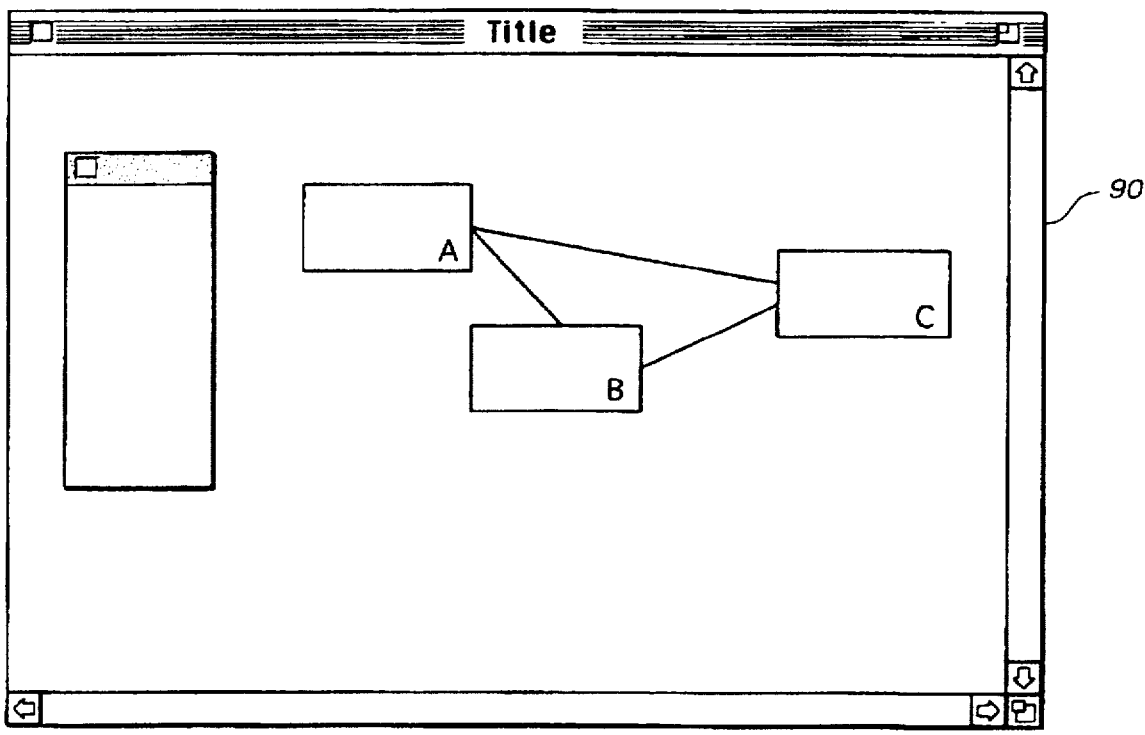
FIG._9
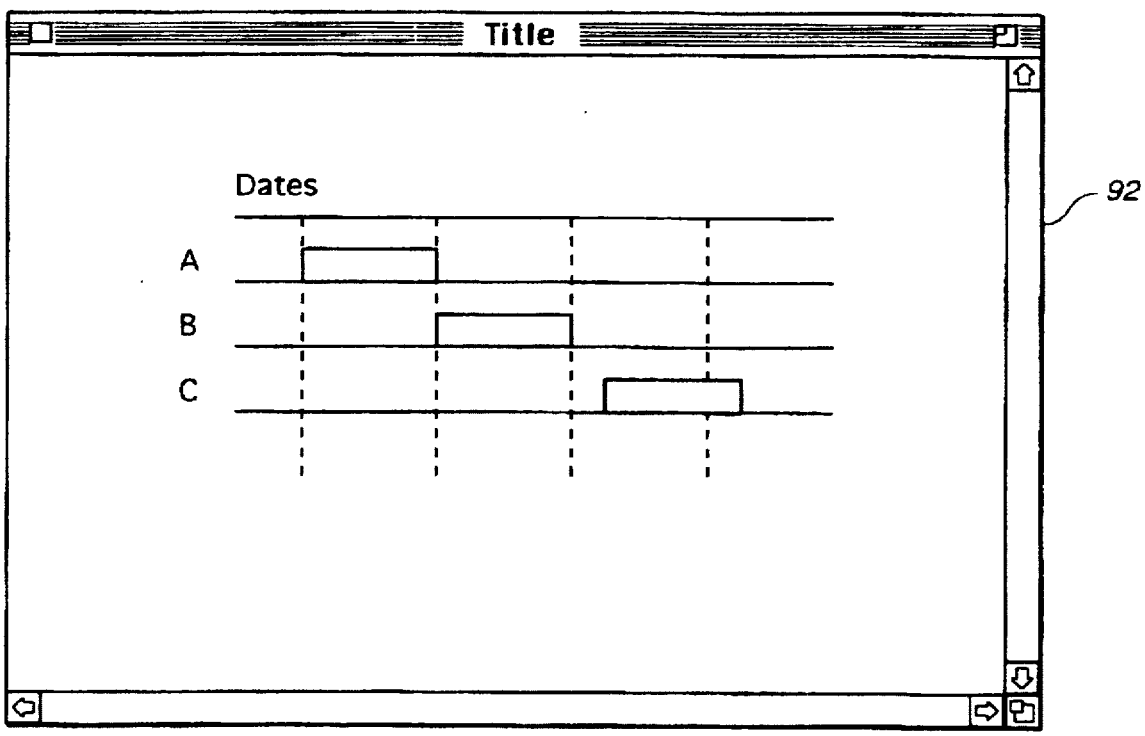
FIG._10

5,745,113

REPRESENTING WORK PRACTICES

BACKGROUND

The invention relates to computer programs for collecting and representing data about human environments and activities, and in particular about work practices.

Collecting information in the field in the study of practices and sites of human activity has traditionally involved using one or more of the following technologies: the direct recording of data, such as by video or audio tape, and the recording of notes, such as by audio recording, written text, and notations on maps and forms. Generally, a large amount of highly varied kinds of information needs to be gathered and then considered. The kinds of information may include information about the physical space; about the people's hierarchical or formal relationships (in the case of a business, for example); about the people's informal relationships; about people's social relationships; about people's family relationships; about people's communications with each other; about how activities take place; about how equipment, resources, and artifacts are used; about when and how people interact; about where people and things are located; about when and how people and things move from place to place; about responsibility of tasks; and so on.

In analyzing work practices in particular, workplace designers need to gather such information in a systematic manner and analyze it as a whole. Work practice designers also need to be able to represent and present information in forms that help the designers find patterns in the information and that are natural and persuasive to different constituencies. There is therefore a need for a system of representational tools to assist ethnographers and others in gathering, analyzing, and presenting information about activities and settings, and in particular about work practices, and to do so in forms of representation that are natural to the nature of the information. There is also a need for a system of tools that facilitates the presentation of information, and in particular that facilitates the presentation in one form of representation information that was gathered in another form of representation.

SUMMARY

In general, in one aspect, the invention provides a system for recording and displaying information about work practice having a set of at least two different graphical tools, each having a graphical user interface and each being associated with at least one kind of information about work practice and at least one kind of workplace object. The graphical user interface of each tool displays information about work practice using at least one display metaphor that is characteristic of the tool and that is conventional for a kind of information associated with the tool. The display metaphor includes display objects for representing workplace objects of a kind associated with the tool. The graphical user interface of each tool displays a characteristic display metaphor for a user to manipulate to provide information about work practice to the system. Each tool in the set of tools has at least one characteristic display metaphor that is different from at least one of the characteristic display metaphors of every other tool in the set of tools. And, the graphical user interface of one tool provides a characteristic graphical display that is augmented to display information of a kind associated with a different one of the set of tools.

Embodiments of the invention may include the following features. Each tool of the set of tools provides a graphical display with its characteristic display metaphor augmented to display information of a kind associated with a different one of the set of tools. Each tool of the set of tools provides a filter module responsive to information of the kind accepted by a different one of the set of tools, whereby information received by the system through one of the set of tools can be used by a different one of the set of tools to control or augment its display of information. The set of tools includes at least two of a map editor, a relationship editor, a time line editor, and a project editor. The system includes a map editor and a relationship editor. The relationship editor provides for input to the system of status of workplace objects with respect to a user-selected relationship. The map editor provides in response to a user request a map display augmented to highlight some map objects according to the status of their corresponding workplace objects as provided to the system through the relationship editor, and the map editor provides in response to a user request a map display augmented to display some map objects as graphically connected according to the status of their corresponding workplace objects as provided to the system through the relationship editor.

In another aspect, the set of tools includes three or four of a map editor, a relationship editor, a time line editor, and a project editor. Embodiments of the invention may include the following features. One of tools provides for associating a textual annotation with a display or a display object. Each tool has means for associating time-dependent properties with display objects. In another aspect, the system includes at least one tool having means for displaying a sequence of graphics, each having associated with it a display time each having a set of display objects displayed to show their properties as of the display time. The system has a database and a database editor, with an interactive user interface, for adding data to, and retrieving data from, the database; and each tool has a programmatic interface to retrieve data from the database.

In general, in another aspect, the invention provides a system having a map editor and a relationship editor. The map editor provides for a user to draw, modify, and display a map including map objects representing workplace objects, and for a user to create map objects and user-defined map object types, including a map object representing a person. The map editor has pre-defined map object types or a wall, a desk, a computer, a telephone, a window, or a door. The relationship editor provides for a user to enter, modify, and display a relationship diagram including display objects representing workplace objects, and for a user to create user-defined relationship types and create instances of relationship types between or among workplace objects. Embodiments of the invention may include the following features. The relationship editor has means for displaying an organization chart, a kinship diagram, a set diagram, or a social network. The map editor has means for a user to record activities on a map and the relationship editor has means for a user to record activities on a relationship diagram. The map editor has means for associating time-dependent properties with map objects and the relationship editor has means for associating time-dependent properties with relationships. The map editor has means for storing in the database information recorded on a map and the relationship editor has means for storing in the database information recorded on a relationship diagram. The map editor creates a sequence of maps in response to a user request, each map in the sequence other than the first being an overlay layer to the previous map in the sequence. The relationship editor creates a sequence of relationship diagrams in response to a user request, each relationship diagram in the sequence other than the first being an overlay layer to the previous relationship diagram in the sequence.

Embodiments of the invention may also include the following features. The map editor, in response to a user request, displays a sequence of maps, where each map in the sequence has associated with it a display time, such as a range of times or a particular time, and where each map includes a set of map objects displayed to show properties of the objects as of the display time. The relationship editor, in response to a user request, creates a sequence of relationship diagrams, where each relationship diagram in the sequence has associated with it a display time, such as a range of times or a particular time, and where each relationship diagram includes a set of display objects displayed to show properties of the objects as of the display time. The map editor displays, in response to a user request, a subset of a map for processing or display based on information in the database. The relationship editor displays, in response to a user request, a subset of a relationship diagram for processing or display based on information in the database.

The system may include a time line editor for a user to draw, modify, and display a time line including display objects representing activities or events relating to workplace objects, including activities or events recorded in the database by other tools in the set of tools, and for a user to create display objects representing activities or events. The time line editor may provide for a user to create user-defined display object types for representing activities or events and the time line editor, in response to a user request, displays a sequence of time lines, where each time line in the sequence has associated with it a display time, such as a range of times or a particular time, and each time line includes a set of display objects displayed to show properties of the objects as of the display time.

The system may also include a project editor for a user to draw, modify, and display a task network diagram including display objects representing tasks, including tasks recorded in the database by other tools in the set of tools, and for a user to create display objects representing tasks. The project editor may provide for a user to create user-defined display object types for representing tasks, and the project editor, in response to user requests, draws, modifies, and displays a task time line including display objects representing tasks, the task time line providing a time line view of the information displayed in the task network diagram. The project editor may display a sequence of task network diagrams in response to a user request, where each task network diagram in the sequence has associated with it a display time, such as a range of times or a particular time, and each task network diagram includes a set of display objects displayed to show properties of the objects as of the display time.

In general, in another aspect, the invention provides a system for recording and displaying information about work practice. The system has a relationship editor for a user to enter, modify, and display a relationship diagram including display objects representing workplace objects, and for a user to create user-defined relationship types and create instances of them between or among workplace objects. The system also has database editor with an interactive user interface for adding data to, and retrieving data from, a database. The relationship editor has a graphical user interface for displaying information about work practice for at least two different kinds of relationship diagram and a programmatic interface to retrieve data from the database, and the relationship editor simultaneously displays in response to a user request two relationship diagrams of different kinds selected from organization chart, kinship diagram, set diagram, or social network, as overlays one over the other. Embodiments of the invention may include the following features. The relationship editor has means for a user to record activities on a relationship diagram, for associating time-dependent properties with relationships, and for storing in the database information recorded on a relationship diagram. The relationship editor has means for creating a sequence of relationship diagrams in response to a user request, with each other than the first being an overlay layer to the previous relationship diagram in the sequence. The relationship editor includes means for creating a sequence of relationship diagrams in response to a user request, where each relationship diagram has associated with it a display time, such as a range of times or a particular time, and where each relationship diagram includes a set of display objects displayed to show properties of the objects as of the display time. The relationship editor includes means for displaying a subset of a relationship diagram in response to a user request based on information in the database.

The invention may have one or more of the following advantages.

The invention provides convenient and easily used tools for making maps of work practices and charting the relationships between and among workers. The maps and charts are easy to modify, so corrections and additions can readily be made to it. Currently, field notes are heavily biased in favor of plain text; with the invention, richer field notes can readily be recorded and edited.

In the invention a map or diagram may be used as a base for data collection. The objects displayed can have a set of properties associated with them, which set of properties can be dynamically extended by a user in the field; and these properties can be used in data analysis and presentation.

In the invention a map or graph diagram may be used as a base for the collection of time-based data, whether in the form of periodic spot observations, time-stamped recording of events on the map or graph, or otherwise.

When used by a team, the system of the invention allows the gathering of field data to become more systematic as members of the team define templates for gathering data and then use the templates in the field. As a consequence, the information collected by different members, possibly at different times and in different locations, will be directly comparable and can readily be presented and analyzed as a whole. The invention is well adapted to be used on small, laptop and palmtop computers and pen- or touch-based computers commonly referred to as personal digital assistants.

The invention provides a way of building up a shared database about how work is organized and takes place, as well as multiple different ways of viewing the information. The invention allows a user to filter the information shown and to build up a complex display in an intelligible way with successive overlays.

The invention enables users to control the display of information by one tool, such as the map editor, in terms of information entered through a different tool, such as the relationship editor.

Use of the invention encourages joint reflection on multiple levels, so that it is a tool for learning in organizational team settings. It supports building empirically grounded, shared views of work practices. By supporting the development of shared representations, it stimulates, and provides a basis for, conversations among different constituencies.

Other advantages and features will become apparent from the following description and from the claims.

BRIEF DESCRIPTION OF THE DRAWINGS

FIG. 1 is a block diagram of a system of representational tools.

FIG. 2 is an illustration of the main window of a map editor.

FIG. 3 is an object editor window of a map editor.

FIG. 4 is a record type definition editor window of a database editor.

FIG. 5 is a field type definition editor window of a database editor.

FIG. 6 is another field definition editor window of a database editor.

FIG. 7 is an illustration of the main window of a database editor browser.

FIG. 8 is an illustration of the main window of a relationship editor.

FIG. 9 is a task network window in a project editor.

FIG. 10 is a time line window in a project editor.

DETAILED DESCRIPTION

Turning to FIG. 1, a system 12 of representational tools is useful to ethnographers in general and, in particular, to people who study and design work practices. When analyzing a workplace, large amounts and various types of information need to be considered: the physical space where people and objects are located; the formal organization of who reports to whom; the informal organization of who works with whom; the social connections between people; the tasks the work is broken down into; and so on. The system integrates a suite of tools to support work practice designers as they collect data about a workplace, aid them in analyzing it, and help them present their findings. These tools include a map editor, a database editor, and others, as will be described.

The tools 20a–d in the representational tool system operate on a computer 22 or network of computers (not shown), and a user will interact with the tools through graphical user interfaces by using a keyboard and/or a pointing device (e.g., a mouse 23), such as are provided by the Macintosh® operating system from Apple Computer, Inc. of Cupertino, Calif. In one embodiment, the tools are implemented using the Think C++ version 7.0 development environment, including its visual architect and class library, available from Symantec Corporation of Cupertino, Calif. For a larger embodiment, a commercial, object-oriented database manager 24 would be preferred. Use of the representational tools involves conventional graphical user interface operations familiar to users of draw, database, and flowchart application programs on such operating systems.

The system's tools represent as display objects and data objects (in the programming sense of "object") people, equipment, furniture, artifacts, tasks, events, and other physical and conceptual things that may appear or take place in a workplace, and that may be subjects of observations entered into the system. The members of this latter group of people and real and conceptual things are also referred to as "objects" or, where there is a need to avoid ambiguity, as "workplace objects", as distinguished from "data objects" and "display objects".

The term "tool" is used here in a broad sense to encompass a unit of computer programming that performs a related set of functions on, and presents a related set of views of, a set of data. A tool may be designed to operate as a self-sufficient component of a larger system or as a functional module that is fully integrated into such a system. In the latter case, a tool may share substantial amount of code with other tools of the system. A graphical tool is simply a tool that has a graphical user interface, which will generally use one or more display metaphors—such as a desk top, a map, a flow chart, an outline, a control panel, a tree diagram, a Venn diagram, a decision tree, kinship diagram, an organization chart, for example—to interact with a user. Often, a graphical tool will have one or more characteristic display metaphors that are conventional for the kind or kinds of information associated with the tool—for example, an organization chart tool will generally use a hierarchical tree diagram display metaphor, which is conventional to represent information about hierarchical relationships.

The Map Editor

The system includes a map editor 20a. Turning to FIG. 2, the map editor can be used to make a map showing a site's physical layout, its infrastructure, the people who are found there, activities that occur there, and so on. A completed map of a workplace will typically include both physical and social features of a work setting. For an office setting these might include desks, telephones, doorways, windows, computers, printers, people, and so on. For an urban area, a map might include buildings, roads, and restaurants.

Each map, and each object on a map, represents its state as of a particular time or period of time, which may be entered as a property of maps and objects.

To create a map, a user will select a menu command that creates a map. Such commands include New, to create a new map; Copy, to create a new copy of an existing map; and Overlay, to create an overlay onto a current open map. To add to a map, a user will select an object type from a palette of objects 30 and place it in the map drawing pane 32, creating an instance of the object type. There the object can be positioned, resized, duplicated, grouped with other objects to form larger objects, aligned with another objected, deleted, and so on. Because the map editor records information in terms of objects, a map can be used to analyze information and control its display in terms that are meaningful to the user.

The map editor has a number of predefined types of objects that might be found in typical office settings, e.g., walls, partitions, desks, chairs, and photocopiers. The objects appear in palettes, a limited number of which may be selected by the user to appear on the map editor window. A user may create new objects and palettes at any time. The predefined palettes and their objects include the following:

| Palette | Objects |
| --- | --- |
| Building Structures | Wall (Horizontal or Vertical), Partition (Horizontal or Vertical), Column, Door (Left or Right), Opening, Window, Stairs |
| Office Equipment | Telephone, Fax Machine, Photocopier, Computer Terminal, Macintosh Computer, IBM PC, Printer, Video Camera |
| Miscellaneous | Lamp, Refrigerator, Coffee Maker, Water Cooler, Paper Pad, Manual, Waste Basket, Arrow |
| People | Supervisor, Manager, Rep, Other |

An object such as a desk has an initial size, and the predefined objects are sized to correspond to each other, so that the desk chair, for example, will match the desk. The size of an object may be changed. Some objects may be defined to have fixed proportions, so that their sizes can be changed, but not their proportions.

A user may group and ungroup objects, to attach pictorially a phone to a desk, for example. Grouped objects are treated as a single object for drawing and editing purposes but not for operations on the system's database 26 or operations involving selective display. Objects are normally drawn in the order they are added to the map. A user may change the display order.

Text can be added to a map as text objects (essentially labels) or note objects (for larger amounts of text). A text object looks like a label. A user may reposition and resize text objects. A note object on a map looks like a yellow Post-It™ brand note. Opening a note displays a note editor window that supports complete set of editing, formatting, and printing features. A note object (like other objects) may have a label. Note objects (like other objects or classes of objects) may be hidden as a group.

The scale that the map objects are drawn in can be changed by using "Zoom In" and "Zoom Out" buttons 36.

Turning to FIG. 3, an object editor, invocable as a menu item, allows a user to create new types of display objects (user-defined map object types) or modify existing ones. Through dialog boxes, the user selects an existing or new object, edits how it is displayed on a map, edits the icon used for it on palette buttons, specifies the types of record in the database that objects of the type can point to, renames it, or removes it. The object 40 drawn on a map is created and edited in the object editor by drawing and moving lines, rectangles, ovals, and so on, as is conventional in draw applications. Grid lines 42 and a scale 44 allow the user to give the object correct dimensions. A user may also define a macro object type to consist of any number of basic objects, either grouped or not, that can be added to a map in one operation, for example, a typical set of office equipment including desk, chair, telephone, and computer.

As will be described, each object may be linked to one database record. The display of objects in a map may also include the display of one or more fields from the object's database record. For each field to be displayed, the field's drawing element is added to the object drawing and linked to the field whose content is to be displayed. In this way, it is easy to add many differentiated objects of the same type to a map.

The system supports various uses of imported audio and pictorial information. A user may have the map editor 20a install and scale a picture bitmap, e.g., a scanned map, as a background layer in the map window drawing pane 32. A user may have the map editor 20a or the relationship editor 20b input pictorial, video, or audio information as note objects.

Each object created by the map editor or another tool may have properties. In one embodiment, object properties are defined as fields in associated database records, which may be defined implicitly (that is, by the map editor or other tool) or by a user through the database editor interface. Using objects' properties, a user may define classes of objects by including class membership among the objects' properties. Class membership properties, like other properties, can be used for filtering, display, and reporting.

The map editor allows a user to define regions, such as the boss's office or the sales department, with an enclosing polygon. Such regions are treated as properties of the objects located in them, and may have properties of their own.

The map editor allows a user to join multiple maps together. In addition to overlaying multiple maps upon each other, a user may join maps logically at their edges, so that, for example, distances can be calculated and connections can be made from an object on one map to an object on another map. A user may also define one map as corresponding to a region of a larger map, so that, for example, on the larger map the region appears simply as an undifferentiated area whose details are disclosed when the logically embedded map is displayed. The system provides hypertext-like links to enable a user to move from one map to another.

The Database

Each object in a map, or in any of the other graphical displays of the system's tools, can be associated with records in a database 26 containing additional information about the object. The database 26 operates with all the tools of the system, but will now be described specifically in terms of its operation with the map editor 20a.

The system allows database records to be accessed directly through a database editor 20c of menu commands, dialog boxes, and other conventional interface elements. Map objects and database records may be associated with each other by using the map editor to select objects and then link them to database records. A user may create, modify, and query the database records. Some fields and records contain information generated by graphical interface operations, such as the placement or moving of an object, and are created implicitly and normally hidden from the user in the database interface display. Database records associated with an object are accessible through database commands in the system menu or through a hypertext-like link that appears when a displayed object is opened. When the map editor 20a displays a map, the database information can be referenced by filters to control whether and how objects are displayed. (A filter is a program module, which may have a user interface, that provides a filtering function of selecting designated subsets of a set of data. A particular set of values or parameters for the filtering function may also be referred to as a filter, as will be clear from the context.)

The database 26 has user-defined record types (e.g., employee, manager, computer) having user-defined fields (e.g., name, age, works with). At any point, a user may modify existing fields or add new fields. Thus, the system allows a user to change the database on the fly, while doing field work, for example.

A database editor dialog window provides an interface for a user to create and edit record type definitions for the database. After selecting or creating a record type, the user can edit, rename, or remove it. The database includes the following predefined field types: text, number, Boolean, date, time, single and multiple-item multiple choice, pointer to records and sets of records, comment, and note. Turning to FIG. 4, in a dialog window 50 to edit the fields of a record, the fields 52 in the selected record type are listed in a user-selected display order 54. After selecting a field, the user can edit, rename, move, or remove it. A user can create a new field and place it in the display list. The fields have an optional sort order to control how records will be sorted in the database.

Turning to FIG. 5 and FIG. 6, dialog boxes, such as boxes 60 and 62, are provided for the user to edit fields. The user selects, and may change, the data type of a field. The dialog box layout is specific to each data type. The properties of each field can be specified, including permissible values or ranges of values, and a default value to use when creating new records.

Turning to FIG. 7, a user can browse the records in a database by using a database editor browser window 70. The user selects the type 72 of records to view. A user can create a new record of the selected type, edit the record being viewed, remove that record from the database, and select another record to view.

The Relationship Editor

Turning to FIG. 8, the system includes a relationship editor 20b to enter, edit, display, and print relationship diagrams, that is, information in a graphical form about relationships between and among objects, including people, artifacts, and systems. For example, the relationship editor 20b allows users to record and display in a window 80 social relationships in the workplace such as friendship networks, kinship networks, past work relationships, and so on. The relationship diagrams include graphs and set diagrams, including the familiar organization charts, kinship diagrams, taxonomies, flow charts, sociograms, and so on.

One form of representation of relationships is the graph. The term graph is used in a fully general sense to refer to any number of nodes (e.g. boxes, ovals, icons) connected by any number of lines (or arcs). Nodes may represent people, artifacts, tasks, and so on; lines indicate the relationships between or among them. Nodes and lines are both objects.

The interface for the relationship editor is generally like the interface for the map editor. The user selects representational objects from palettes 82, places the objects on the drawing pane 84 in the relationship editor window 80, and connects them up.

With the relationship editor, a user may select from a menu of special purpose diagrams, including organization charts, kinship diagrams, flow charts, taxonomies, computer networks, and sociograms. Each type of diagram has associated with it a characteristic palette of nodes and relationships, along with appropriate defaults for drawing and connecting objects, from which the user can graphically build a diagram.

The relationship editor allows a user to control the manner of display of a diagram, including its orientation, e.g., top-to-bottom or left-to-right, and its graphical style. A user may select an egocentric display with reference to a specific person or object in a diagram. A graph of directional relationships is by nature hierarchical, and when such a graph is displayed, the relationship editor normally uses one dimension of the display to show the hierarchy—for example, by displaying an organization chart from top to bottom. With a graph of a symmetric relationship, no intrinsic meaning would be assigned to any dimension of the display, but the distance between two nodes may be visually meaningful—for example, in a sociogram—and is so displayed in the appropriate case.

The relationship editor allows a user to create a set diagram by drawing a bounding closed figure (such as a rectangle or oval), whose form may be selected to provide information about the set, and then graphically placing objects representing members of the rest in the closed figure. Individual objects and sets of objects may be placed in a set. A user may partition objects represented in a database into sets in a set diagram based on the objects' properties.

With the relationship editor, a user may display a variety of set-based and other relationships. For example, the relationship editor can display set intersections by Venn diagrams and sort set members according to their properties for display, on one or two axes. For example, a set of stakeholders can be displayed along an axis according to how much they support some position.

Given a display of a relationship diagram, the relationship editor enables a user to create overlays showing additional information or relationships, or showing changes to objects, including relationships, over time. This additional information may be derived from other relationship diagrams, or it may be derived from the system's maps or database. Thus, for example, nodes or arcs may be colored or highlighted based on their satisfying some property, or color intensities may be used to display properties along a numerical range, or an overlay of additional arcs or nodes may be added to show additional relationships.

Recording Temporal Information

Objects on a map or on a relationship diagram normally have temporal information associated with them or their properties. For example, for an object representing an event, this could include the time the event occurs; for one representing a task, the time(s) the status of the task changes; for one representing a person, the time the person is at the mapped place, or in the indicated relationship; for one representing a document, the time the document is at the mapped place; and so on. The associated times may be entered into the system explicitly. Normally, however, it is more convenient to have them set by some default. When a user is engaged in contemporaneous recording of observations, real clock time is a useful default. When a set of spot observations is made on an overlay map—to record everyone's location at a particular time, for example—one time would most conveniently be given as a property of the overlay map and inherited by all the objects entered there.

A separate aspect of the recording of data is the identification of the person collecting the data, when it was collected, any title or comments associated with the collecting, and so on. This information may also be preserved as properties of the map and relationship diagram objects. The system provides a selectable display showing when observations were made based on time of day, day of week, or day of month. One purpose for this observation calendar is to help researchers easily identify any possible oversights in the schedule of actual observations.

Merging Observations

The system may be used by a group of users simultaneously sharing a database, in a network mode. The system may also be used by individual users in a standalone mode, with each user essentially carrying around his or her own copy of the maps, diagrams, database, and so on. The facilities for time stamping observations, either against a real or a synthetic clock, allow the data from multiple researchers/observers to be merged and treated as an integrated whole. To achieve this, each observer should begin with the same map(s) and/or relationship diagram(s) and should enter data with reference to the same clock. Data for objects that existed at the beginning of the observations is then easily integrated. Data for an object that came into being during the observations, such as one representing a newly created document, if recorded by multiple observers, could be merged through an analysis of the pattern of creations and disappearances; however, in the preferred embodiment, the system simply notes all the instances of newly created objects of the same type and asks the user merging the data to join them as appropriate.

Displaying Information

Static displays by the map editor and other tools has been described. The map and relationship editors also provide for the playback of data (observations) to show their temporal aspects. In a time sequential playback, objects or relationships are placed or changed according to their properties through a selected period of time. A time ruler or clock display may be selected to show the passage of time. The style of playback may be continuous (if data was collected continuously), interpolated (to create a continuous appearance), or discrete. Where the observation data is not continuous, indicators such as arrows or moving outlines may be selected to show interpolated motion or other activity.

Playback may also aggregate observations over a period of time, and the extent to which an event occurs, or an object is present, in a place may be shown graphically by indicators such as color, size, or line width. An aggregated time ruler, clock display, or calendar may be selected to show the time period(s) covered, or not covered, by the display.

All displays, including those just described, may be controlled through the use of filters selecting objects for display, and optionally the manner of display, based on the objects' properties and the contents of the database, which may include information entered through tools other than one generating the display. Study and presentation of information in graphical form is supported by the system recording the user's actions in displaying information. Displays may be saved as slides for playback in a slide show. Filters may be named and saved (in the database or, alternatively, in a map or relationship file, or elsewhere) and slide shows may be defined as a list of filters.

Other Tools

Returning to FIG. 1, the system may be embodied to have other representational tools 20d in addition to the map editor 20a, the relationship editor 20b, and the database editor 20c. Such other tools may include a time line editor and a project editor. The system may also be embodied to include a report writer.

Turning to FIG. 9 and FIG. 10, the project editor provides two kinds of editor windows: first, a task network window 90; and second, a task time line window 92. In the task network window 90, the system provides for a user to define and edit tasks and their properties using the same basic techniques that have already been described in the context of the map editor and relationship editor. Task objects begin with a set of predefined properties, which may be extended by a user. The predefined properties include start and stop dates (which may include times), resources required (such as people or equipment), and task dependencies (on which tasks, if any, does this one may depend). Through the resources and other properties, task objects may be linked to the objects of other tools, including map objects and relationship objects.

In the task time line window 92, the system provides for a user to view the information presented in the task diagram in the form of a time line. Predefined time line formats include the simple task time line, which shows time along one axis and tasks placed in time along another axis; and the resource time line, which shows how resources are joined with tasks over time.

The time line editor presents an editor window (like task time line window 92) in the form of a time line on which activities and events can be displayed and edited. The activities and events may be of selected type or types, or involving selected people or objects, or filtered in any other way. The types of activities and events subject to display include activities represented by activity objects on a map, events implied from changes made on a map or a relationship diagram, and events reflecting status, such as that a piece of equipment is in use. The time line display has a time axis running in one direction and one or more lines of activities and events running parallel with it. The lines of activities and events may optionally be grouped in bands based on common characteristics. Time line objects, representing activities or events, may be edited graphically, by moving them on the time line, or by opening and editing their properties. Time line objects may be created by selecting an activity or event icon from a palette, placing it on a time line, and supplying its properties. As applicable, the editing or addition of a time line object will result in a corresponding visual effect on maps, relationship diagrams, or other representational displays.

The report writer of the system allows a user to tabulate and summarize the information collected by the system's tools and recorded in the database. In one embodiment, the report writer is simply a report writer of the database management system for the system's database engine. With the report writer, a user can count the number and types of object or activity that occur in a region or a period of time, or that occur with particular spacial or temporal relationships.

The present invention has been described in terms of specific embodiments. The invention, however, is not limited to these specific embodiments. Other embodiments are within the scope of the claims. For example, the graphical user interfaces of one or more of the tools may present information in two and one-half or three dimensional formats.

What is claimed is:

1. A system for recording and displaying information about work practice, comprising a set of graphical tools each having a graphical user interface, the set comprising at least two different tools, where:

each tool is associated with at least one kind of information about work practice and at least one kind of workplace object;

the graphical user interface of each tool displays information about work practice using at least one display metaphor that is characteristic of the tool and that is conventional for a kind of information associated with the tool, the display metaphor including display objects for representing workplace objects of a kind associated with the tool;

the graphical user interface of each tool provides a graphical display in a display metaphor characteristic of the tool for a user to manipulate to provide information about work practice to the system;

each tool has at least one characteristic display metaphor that is different from at least one of the characteristic display metaphors of every other tool in the set of tools; and the graphical user interface of a first one of the set of tools provides a graphical display with its characteristic display metaphor augmented to display information of a kind associated with a second one of the set of tools.

2. The system of claim 1 where each tool of the set of tools provides a graphical display with its characteristic display metaphor augmented to display information of a kind associated with a different one of the set of tools.

3. The system of claim 1 where each tool of the set of tools provides a filter module responsive to information of the kind accepted by a different one of the set of tools, whereby information received by the system through one of the set of tools can be used by a different one of the set of tools to control or augment its display of information.

4. The system of claim 1 where the set of tools comprises at least two of a map editor, a relationship editor, a time line editor, and a project editor.

5. The system of claim 1 where the first one of the set of tools is a map editor and the second one of the set of tools is a relationship editor;

the relationship editor provides for input to the system of status of workplace objects with respect to a user-selected relationship;

the map editor provides, in response to a user request, a map display augmented to highlight some map objects according to the status of their corresponding workplace objects as provided to the system through the relationship editor; and the map editor provides, in response to a user request, a map display augmented to display some map objects as graphically connected according to the status of their corresponding workplace objects as provided to the system through the relationship editor.

6. The system of claim 1 where the set of tools comprises at least three different tools of a map editor, a relationship editor, a time line editor, and a project editor.

7. The system of claim 1 where the set of tools comprises a map editor, a relationship editor, a time line editor, and a project editor.

8. The system of claim 1 where one of the set of tools includes means for associating a textual annotation with a display or a display object.

9. The system of claim 1, where each tool in the set of tools includes means for associating time-dependent properties with display objects.

10. The system of claim 9, where at least one tool in the set of tools includes means for displaying a sequence of graphics, where each graphic in the sequence has associated with it a display time being a range of times or a point in time, and where each graphic includes a set of display objects displayed to show their properties as of the display time.

11. The system of claim 1 further comprising:

a database;

a database editor, having an interactive user interface, for adding data to, and retrieving data from, the database, where each of the tools in the set of tools has a programmatic interface to retrieve data from the database.

12. The system of claim 11, where the set of tools comprises:

a map editor for a user to draw, modify, and display a map including map objects representing workplace objects, and for a user to create map objects and user-defined map object types, including a map object representing a person, where the map editor includes pre-defined map object types of a wall, a desk, a computer, a telephone, a window, or a door; and a relationship editor for a user to enter, modify, and display a relationship diagram including display objects representing workplace objects, and for a user to create user-defined relationship types and create instances of relationship types between or among workplace objects.

13. The system of claim 12, where the relationship editor includes means for displaying an organization chart, a kinship diagram, a set diagram, or a social network.

14. The system of claim 12, where the map editor includes means for a user to record activities on a map; and the relationship editor includes means for a user to record activities on a relationship diagram.

15. The system of claim 12, where the map editor includes means for associating time-dependent properties with map objects; and the relationship editor includes means for associating time-dependent properties with relationships.

16. The system of claim 12, where the map editor includes means for storing in the database information recorded on a map; and the relationship editor includes means for storing in the database information recorded on a relationship diagram.

17. The system of claim 12, where the map editor creates a sequence of maps in response to a user request, each map in the sequence other than the first being an overlay layer to the previous map in the sequence; and the relationship editor creates a sequence of relationship diagrams in response to a user request, each relationship diagram in the sequence other than the first being an overlay layer to the previous relationship diagram in the sequence.

18. The system of claim 12, where the map editor displays a sequence of maps in response to a user request, where each map in the sequence has associated with it a display time being a range of times or a particular time, and where each map includes a set of map objects displayed to show properties of the objects as of the display time; and, the relationship editor creates a sequence of relationship diagrams in response to a user request, where each relationship diagram in the sequence has associated with it a display time being a range of times or a particular time, and where each relationship diagram includes a set of display objects displayed to show properties of the objects as of the display time.

19. The system of claim 12, where the map editor displays, in response to a user request, a subset of a map for processing or display based on information in the database; and the relationship editor displays, in response to a user request, a subset of a relationship diagram for processing or display based on information in the database.

20. The system of claim 12, further comprising:

a time line editor for a user to draw, modify, and display a time line including display objects representing activities or events relating to workplace objects, including activities or events recorded in the database by other tools in the set of tools, and for a user to create display objects representing activities or events.

21. The system of claim 20, where the time line editor provides for a user to create user-defined display object types for representing activities or events; and where the time line editor displays a sequence of time lines in response to a user request, where each time line in the sequence has associated with it a display time being a range of times or a particular time, and where each time line includes a set of display objects displayed to show properties of the objects as of the display time.

22. The system of claim 12, further comprising:

a project editor for a user to draw, modify, and display a task network diagram including display objects representing tasks, including tasks recorded in the database by other tools in the set of tools, and for a user to create display objects representing tasks.

23. The system of claim 22, where the project editor provides for a user to create user-defined display object types for representing tasks; and where the project editor draws, modifies, and displays, in response to user requests, a task time line including display objects representing tasks, the task time line providing a time line view of the information displayed in the task network diagram.

24. The system of claim 22, where the project editor displays a sequence of task network diagrams in response to a user request, where each task network diagram in the sequence has associated with it a display time being a range of times or a particular time, and where each task network diagram includes a set of display objects displayed to show properties of the objects as of the display time.

25. A system for recording and displaying information about work practice, comprising:

a relationship editor for a user to enter, modify, and display a relationship diagram including display objects representing workplace objects, and for a user to create user-defined relationship types and create instances of them between or among workplace objects, and a database editor having an interactive user interface for adding data to, and retrieving data from, a database; where the relationship editor has a graphical user interface for displaying information about work practice for at least two different kinds of relationship diagram;

the relationship editor has a programmatic interface to retrieve data from the database; and the relationship editor simultaneously displays in response to a user request two relationship diagrams of different kinds selected from organization chart, kinship diagram, set diagram, or social network, as overlays one over the other.

26. The system of claim 25, where the relationship editor includes means for a user to record activities on a relationship diagram;

the relationship editor includes means for associating time-dependent properties with relationships; and the relationship editor includes means for storing in the database information recorded on a relationship diagram.

27. The system of claim 25, where the relationship editor includes means for creating a sequence of relationship diagrams in response to a user request, each relationship diagram in the sequence other than the first being an overlay layer to the previous relationship diagram in the sequence; and the relationship editor includes means for creating a sequence of relationship diagrams in response to a user request, where each relationship diagram in the sequence has associated with it a display time being a range of times or a particular time, and where each relationship diagram includes a set of display objects displayed to show properties of the objects as of the display time; and the relationship editor includes means for displaying a subset of a relationship diagram in response to a user request based on information in the database.

28. A system for recording and displaying information, comprising two graphical tools, each having a graphical user interface, wherein:

a first tool comprises a map editor, wherein the map editor is operable for a user to draw, modify, and display a map, a map showing a physical layout of a site, the map including map objects representing objects at the site, the map editor has pre-defined map object types and is operable for a user to create new user-defined map object types and to create map objects of both pre-defined types and user-defined types, and the map editor is operable to create a sequence of maps in response to a user request, each map in the sequence other than the first being an overlay layer to the previous map in the sequence; and a second tool comprises a relationship editor, wherein the relationship editor is operable for a user to enter, modify, and display a relationship diagram showing display objects representing objects at the site, the relationship editor is operable for a user to create new user-defined relationship types and to create instances of relationship types, and the relationship editor is operable to create a sequence of relationship diagrams in response to a user request, each relationship diagram in the sequence other than the first being an overlay layer to the previous relationship diagram in the sequence.

29. The system of claim 28, wherein:

the map editor comprises means for a user to record activities on a map drawn on a computer graphical user interface; and the relationship editor comprises means for a user to record activities on a relationship diagram.

30. The system of claim 29, wherein:

the map editor is operable for a user to define a region by drawing an enclosing figure on a computer graphical user interface showing the map, the region defining a new property of objects located in the region.

31. The system of claim 28, wherein:

the map editor is operable to allow a user to join multiple maps together logically at their edges.

* * * * *